(No Model.)
F. A. CURTIS.
GEARING.
No. 551,811. Patented Dec. 24, 1895.
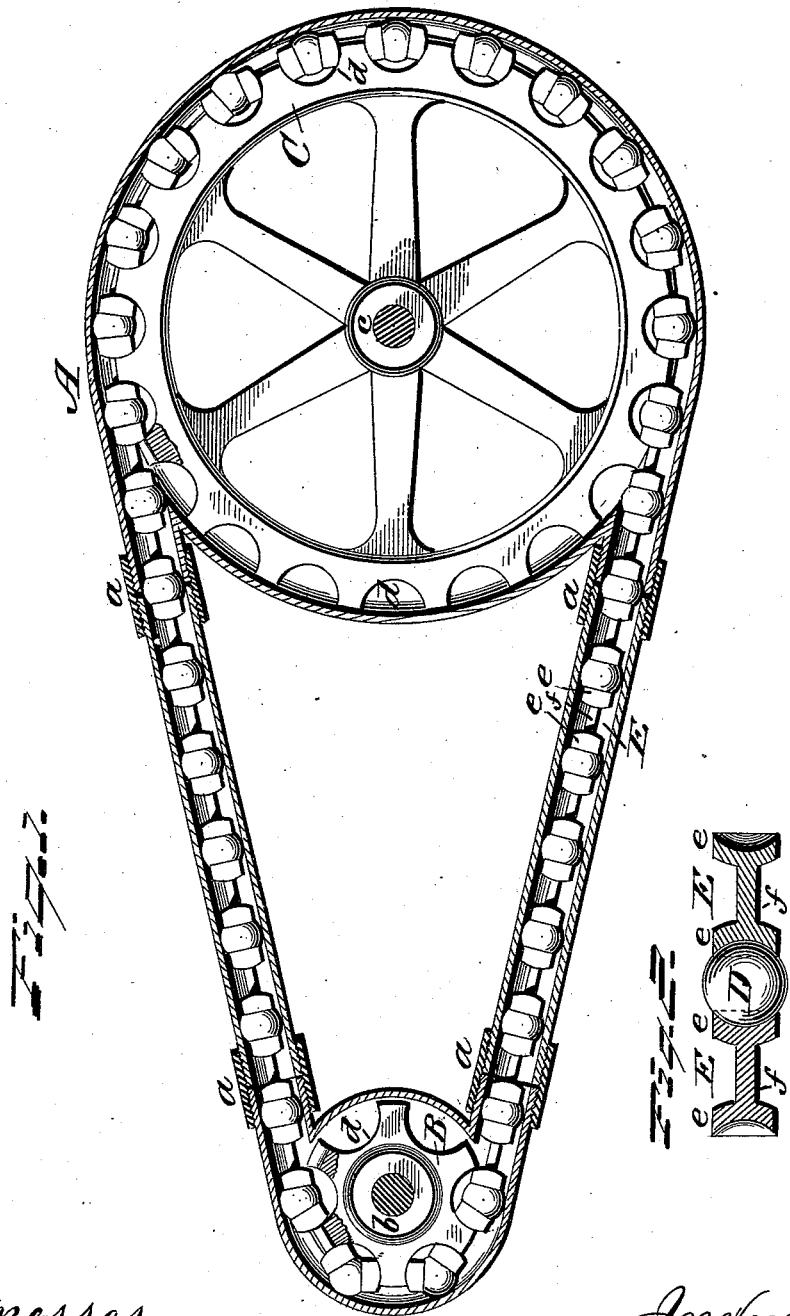

UNITED STATES PATENT OFFICE.

FREDERIC A. CURTIS, OF ANDERSON, INDIANA, ASSIGNOR TO THE WHEEL COMPANY, OF SAME PLACE.

GEARING.

SPECIFICATION forming part of Letters Patent No. 551,811, dated December 24, 1895.

Application filed July 17, 1895. Serial No. 556,233. (No model.)

*To all whom it may concern:*

Be it known that I, FREDERIC A. CURTIS, a citizen of the United States, residing at Anderson, in the county of Madison and State of Indiana, have invented certain new and useful Improvements in Gearing; and I do hereby declare that the following is a full, clear, and exact description of the same, reference being had to the annexed drawings, making a part of this specification, and to the letters of reference marked thereon.

The present invention has relation to that class of driving-gear to take the place of the usual sprocket wheels and chain and in which are employed a chain of balls engaging successively seats or depressions in the periphery of the wheels, thereby transmitting power from one wheel to the other through the train of balls or spheres.

It is the purpose of the invention to provide means for connecting the balls or spheres with each other, whereby a more perfect endless chain is obtained and the balls more perfectly seat themselves in the depressions or cavities upon the periphery of the wheels as said wheels are revolved, as will be hereinafter described, and pointed out in the claims.

Figure 1 of the drawings is a side elevation, partly in section, showing my invention applied as the driving-gear of a bicycle; Fig. 2, a sectional view on an enlarged scale of two of the connections between which the ball is held, said ball being shown in position in full lines.

In the accompanying drawings, A represents a suitable casing to form a continuous or endless channel for a chain of balls hereinafter described. The casing may be formed in sections and afterward connected together by screw-couplings $a$, which engage the screw-threaded ends of the sections, as shown. The casing is so constructed as to inclose the periphery of suitable wheels B C, which are mounted upon shafts $b$ $c$ respectively and one of said wheels provided with the usual means for propelling it as is common in bicycles. These wheels B C have a series of depressions or cavities $d$ to receive the links of an endless chain when the wheels are revolved, thus communicating the power from one wheel to the other necessary to propel the vehicle. The chain is rendered sufficiently flexible to engage itself with the periphery of the wheels as they are revolved, and consists of the balls or spheres D, which are held between concave seats $e$ of links E. There are two of these seats to each link and they are formed integral with a central brace $f$, which provides a connection between the two seats. The concaves in the seats $e'$ correspond with the convexity of the balls D, so they will form a ball-and-socket joint between each link and give the desired flexibility to the chain.

The construction of the chain which forms the principal feature of my invention may be applied to any gearing, whether as a driving power for the propulsion of bicycles or other vehicles or as a means of transmitting or communicating power from one wheel to another in all classes of machinery where endless chains or belting are used, and therefore I may apply the particular construction of chain to any purpose to which it may be found of value without departing from the principle of the invention.

Having now fully described my invention, what I claim as new, and desire to secure by Letters Patent, is—

1. A chain for driving power or other purposes, consisting of a series of links comprising concave seats and a central brace connecting each pair of seats together and balls held between the seats of the opposing links, substantially as and for the purpose set forth.

2. A suitable casing forming a continuous or endless channel, wheels surrounded by said casing and provided with depressions or cavities around their peripheries, and an endless chain engaging therewith and consisting of a series of links, each link comprising two concave seats connected by means of a central brace, and balls held between the seats of the opposing links, substantially as and for the purpose specified.

In testimony that I claim the above I have hereunto subscribed my name in the presence of two witnesses.

FREDERIC A. CURTIS.

Witnesses:
DAVID L. BISHOPP,
D. W. SCANLAN.